Patented June 6, 1933

1,913,014

UNITED STATES PATENT OFFICE

FRANS CORNELIS VAN HEURN, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

RUBBER PRODUCT AND PROCESS OF MAKING THE SAME

No Drawing. Application filed October 29, 1930, Serial No. 492,091, and in Great Britain October 31, 1929.

This invention consists in a process for the manufacture of unvulcanized colored rubber or colored rubber which has been vulcanized in the cold, both kinds of rubber being transparent or translucent.

According to the present invention, I have found that fibrous materials serve as a very suitable vehicle for introducing coloring matters into rubber.

According to one embodiment of the invention the process for the manufacture of unvulcanized colored rubber or cold-vulcanized colored rubber consists in incorporating with rubber latex, which may, if desired, be concentrated, fibrous materials of animal or vegetable origin capable of being colored by coloring matters and then coagulating the latex, if desired, after articles have been prepared from the mixture in known manner as by dipping and subsequently bringing the coagulated rubber or articles of coagulated rubber into contact with coloring matters, preferably organic dyestuffs, dissolved in liquids which do not have any material solvent effect upon the rubber.

The fibrous material used preferably consists of thin transparent fibres having a large lumen or channel so that the latex can readily penetrate the fibres and expel the air. When such fibres are employed they are almost invisible and the transparency of the rubber remains unimpaired.

I have found that kapok fibre is particularly serviceable for the purpose of this invention, because it possesses the advantage that large quantities may be incorporated with the latex, thereby assisting uniform coloring of the coagulated rubber, while the properties of the coagulated rubber are not noticeably influenced. In addition, kapok fibre is obtainable in the countries where rubber latex is tapped and worked up into crepe. Although kapok fibre produces a very good result, other fibrous materials, such as cotton, silk and artificial silk may also be employed. Fibrous materials which have only a small lumen or no lumen at all can also be used, but in this case the transparency of the coagulated rubber is diminished.

The process of this invention may be illustrated by the following example:

10 kgs. of kapok fibre are introduced into 600 litres of rubber latex of 20 per cent. The mixture is coagulated by means of acetic or formic acid in the presence of bisulphite and the coagulum is worked up into blanket, sole-crepe or any other shape of crepe. The rubber is then placed in an aqueous solution of the desired coloring matter and allowed to remain therein until the coloring matter has sufficiently permeated the material. The rubber is then removed, rinsed with water in order to remove any superfluous dyestuff and dried.

In place of aqueous solutions of dyestuffs, alcoholic solutions may be used.

According to another embodiment of the invention rubber solutions may be employed in place of rubber latex. Thus, crepe rubber containing the fibrous materials such as kapok fibres, may be dissolved or made into a plastic in a rubber solvent and articles may be made therefrom in the usual manner. Alternatively, the fibrous materials, such as kapok fibres, may be stirred into a solution or plastic of unvulcanized rubber.

In place of rubber latex, aqueous dispersions of rubber or rubber-like substances artificially produced may be used.

The colored rubber or colored rubber articles produced in accordance with this invention may be cold-vulcanized in known manner, whereas the coloring may also take place after cold vulcanization, cold vulcanized products being permeable to water and aqueous solutions of dyestuffs.

I claim as my invention:

1. The process for the manufacture of colored rubber-like material, comprising the step of treating rubber-like material in which fibrous material is incorporated with a solution of a coloring matter in a solvent which has substantially no solvent effect upon the rubber-like material.

2. A process for the manufacture of unvulcanized transparent or translucent colored rubber or cold vulcanized transparent or translucent colored rubber from aqueous dispersions of rubber which consists in incorporating with said dispersion fibrous materials of animal or vegetable origin and capable of being colored by coloring matters, in coagulating the aqueous dispersions of rubber, and in bringing the coagulated rubber into contact with solutions of suitable coloring matters capable of being absorbed by the fibrous materials.

3. A process as claimed in claim 2 wherein kapok fibre is employed as the fibrous material.

4. A process as claimed in claim 2 wherein cotton is employed as the fibrous material.

5. A process as claimed in claim 2 wherein silk is employed as the fibrous material.

6. A process which comprises shaping an article from an aqueous dispersion of rubber having thin transparent fibres incorporated therein, in known manner upon moulds by dipping, coagulating the rubber in the shaped article and bringing the article into contact with a solution of coloring matter.

7. The process claimed in claim 1 wherein solutions or plastics of crepe rubber are employed as the rubber-like material.

8. A process as claimed in claim 6 wherein the shaped articles are made from solutions or plastics of crepe rubber in known manner.

9. As a product of manufacture, a rubber-like material having uniformly incorporated therein colored kapok fibres, said product exhibiting the normal transparency of the rubber-like material.

10. As a product of manufacture, rubber-like material having uniformly incorporated therein colored fibrous material, said product exhibiting the normal transparency of the rubber-like material.

Signed at Amsterdam this 16th day of October A. D. 1930.

FRANS CORNELIS VAN HEURN.